(12) United States Patent
Raghavan et al.

(10) Patent No.: US 7,676,564 B2
(45) Date of Patent: Mar. 9, 2010

(54) MANAGING STORED DATA ON A COMPUTER NETWORK

(75) Inventors: Kartik N. Raghavan, Seattle, WA (US); Thomas G. Phillips, Bellevue, WA (US); Bohdan Raciborski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 370 days.

(21) Appl. No.: 11/236,256

(22) Filed: Sep. 27, 2005

(65) Prior Publication Data

US 2006/0026230 A1 Feb. 2, 2006

Related U.S. Application Data

(62) Division of application No. 10/164,950, filed on Jun. 6, 2002, now abandoned.

(51) Int. Cl.
*G06F 15/173* (2006.01)
*G06F 17/30* (2006.01)
(52) U.S. Cl. .................... 709/223; 707/9; 709/206; 709/226

(58) Field of Classification Search .................. 707/9; 709/206, 223, 226
See application file for complete search history.

(56) References Cited

U.S. PATENT DOCUMENTS

| 5,842,214 | A | * | 11/1998 | Whitney et al. ............... 707/10 |
| 6,389,432 | B1 | * | 5/2002 | Pothapragada et al. ....... 707/205 |
| 6,671,776 | B1 | * | 12/2003 | DeKoning ................... 711/114 |
| 6,968,434 | B2 | * | 11/2005 | Kamano et al. .............. 711/163 |
| 7,024,427 | B2 | * | 4/2006 | Bobbitt et al. ............... 707/200 |
| 7,177,953 | B1 | * | 2/2007 | Jackson et al. .............. 709/250 |
| 7,222,176 | B1 | * | 5/2007 | Laurent et al. .............. 709/226 |
| 2003/0093647 | A1 | * | 5/2003 | Mogi et al. .................... 712/1 |

* cited by examiner

*Primary Examiner*—Kenny S Lin (57) ABSTRACT

A method and system for managing stored data on a computer network organizes data into logical volumes, and each logical volume has a friendly name associated with it. A domain controller keeps track of the friendly names of the logical volumes and associates those friendly names with the actual physical paths of the logical volumes. When a client computer on the network wishes to access a logical volume, it sends a look-up request having the friendly name to the domain controller. The domain controller may fulfill the request by sending the path of the logical volume to the client computer.

9 Claims, 4 Drawing Sheets

FIG. 4 ial volumes. When a client
MANAGING STORED DATA ON A COMPUTER NETWORK

RELATED APPLICATIONS

This is a Divisional of U.S. patent application Ser. No. 10/164,950, titled "METHOD AND SYSTEM FOR MANAGING STORED DATA ON A COMPUTER NETWORK", filed Jun. 6, 2002, which is hereby incorporated herein.

BACKGROUND

Name services have been in use on computer networks for many years. In general, the main function of a name service is to map a name, such as a file name, or network domain name, to some arbitrary data record, such as a file or a network address. A name service can, for example, receive a "look-up request" that includes a name, such as a textual name of a web site, from a requesting client and return information associated with the name, such as the IP address of the web site, to the requesting party. One of the most popular name services in use today is the Domain Naming Service (DNS).

One function of a name service is to define a namespace for computers on a network that is independent of the physical addresses used by the network. For example, if the website www.foo.com changes its IP address from 100.0.0.1 to 100.0.0.2, the website simply registers the change with the nearest DNS server. The DNS server responds by de-associating www.foo.com from the IP address 100.0.0.1 and creates a new association between www.foo.com and 100.0.0.2. Thus, the rest of the world remains unaware that there was ever any change, and continues to type www.foo.com in their web browsers and achieve the desired result of reaching the website.

A data storage device, such as a magnetic disk drive, can be coupled to or integrated with an individual computer on a network and, therefore, can effectively have its own IP address and participate in a name service such as DNS. However, data storage technology has become increasingly sophisticated. With the proliferation of storage networks, such as so-called Storage Area Networks (SAN), multiple computer systems can now be connected to networks of multiple data storage devices. Although efforts have been made to create a DNS-like naming system for Internet storage systems [see, for example, the Internet Storage Name Service (iSNS), which is documented in various Internet Engineering Task Force (IETF) drafts], there is currently no effective way for a data storage device to divide its computer-readable media (its magnetic disks, for example) into logical volumes and to have each of those volumes be recognized as a separately addressable entity in a name service. Also, there is currently no effective way to build a SAN name space that makes the physical location of a storage device transparent to computer systems that need to access the storage device.

SUMMARY

The invention is generally directed to a method and system for managing stored data on a computer network, in which the data is organized into logical volumes, and each logical volume has a friendly name associated with it. A logical volume may correspond to an individual computer-readable storage element or to a multiple storage elements. For example, a logical volume can represent a single spindle (a physical hard disk), an entire disk array, or a logical partition of a disk array. A domain controller keeps track of the friendly names of the logical volumes and associates those friendly names with the actual physical paths of the logical volumes. When a client computer on the network wishes to access a logical volume, it sends a look-up request, which includes the friendly name, to the domain controller. The domain controller may fulfill the request by sending the path of the logical volume to the client computer.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Prior to proceeding with a description of the various embodiments of the invention, a description of the computer and networking environment in which various embodiments of the invention may be practiced will be provided. Although it is not required, the present invention may be implemented by program modules that are executed by a computer. Generally, program modules include routines, objects, components, data structures and the like that perform particular tasks or implement particular abstract data types. The term "program" as used herein may connote a single program module or multiple program modules acting in concert. The invention may be implemented on a variety of types of computers. Accordingly, the terms "computer," "device," and "computing device" as used herein include personal computers (PCs), hand-held devices, multi-processor systems, microprocessor-based programmable consumer electronics, network PCs, PC servers, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 1:
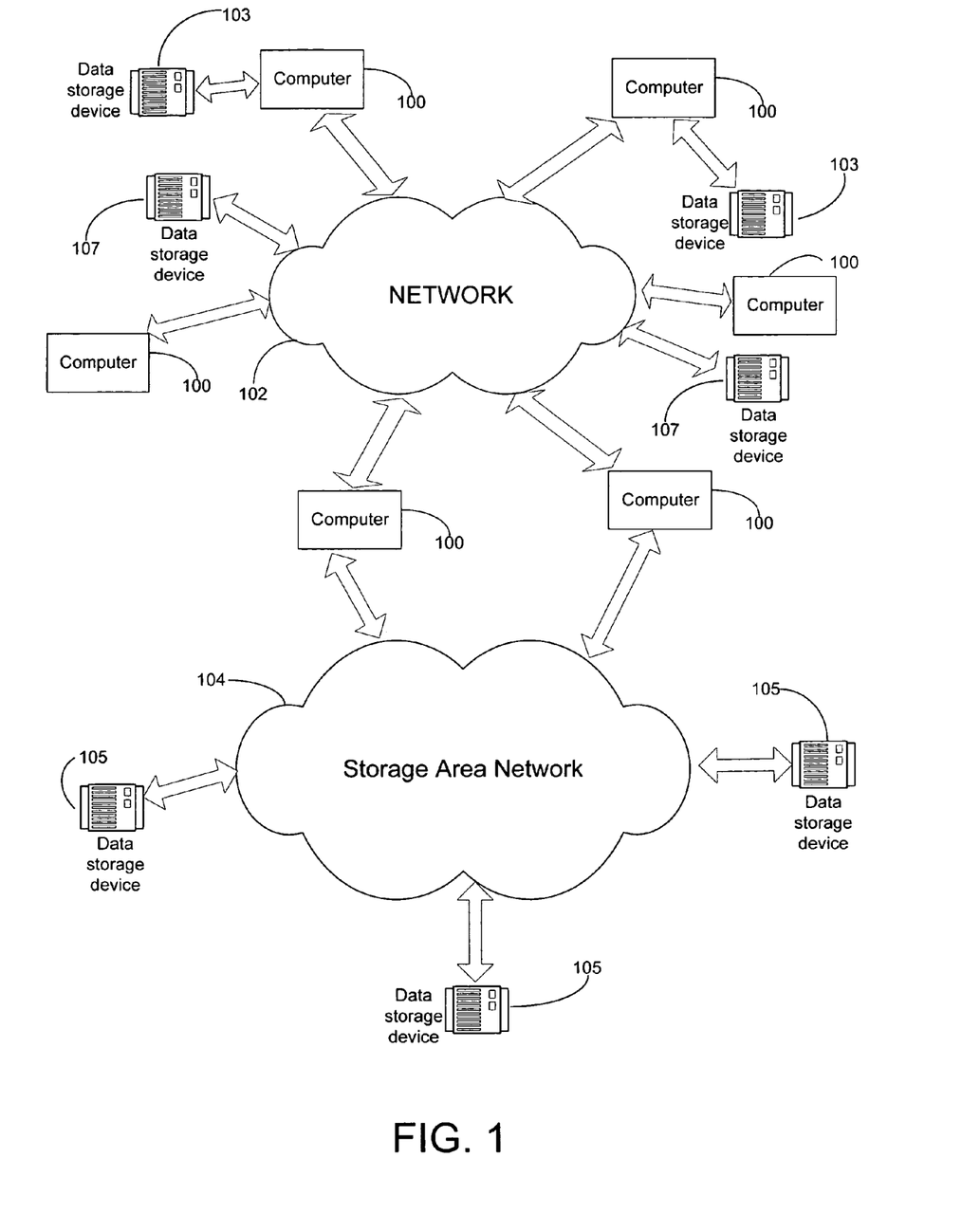
FIG. 1 shows an example of a computer network in which the invention may be practiced.

An example of a networked environment in which the invention may be used will now be described with reference to FIG. 1. The example network includes several computers 100 communicating with one another over a network 102, represented by a cloud. Network 102 may include many well-known components, such as routers, gateways, hubs, etc. and may allow the computers 100 to communicate via wired and/or wireless media. The network 102 may have one or more data storage devices 107 linked to it. The computers 100 may also have data storage devices 103 attached directly to them, or may be communicatively linked to a storage area network 104, which includes one or more data storage devices 105.

Figure 2:
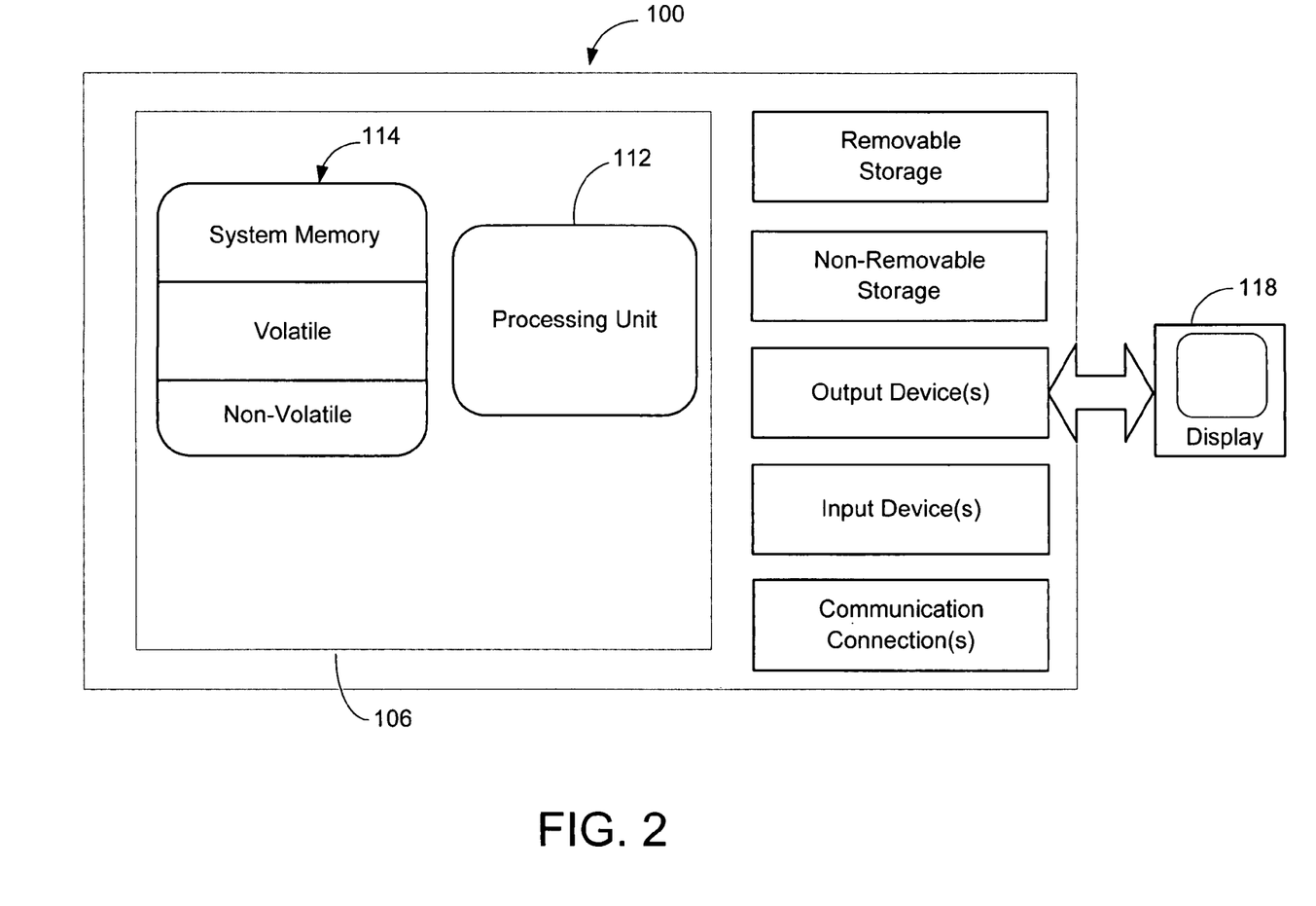
FIG. 2 shows an example of a computer on which at least some parts of the invention may be implemented.

Referring to FIG. 2, an example of a basic configuration for a computing device on which the system described herein may be implemented is shown. In its most basic configuration, the computing device 100 typically includes at least one processing unit 112 and memory 114. Depending on the exact configuration and type of the computing device 100, the memory 114 may be volatile (such as RAM), non-volatile (such as ROM or flash memory) or some combination of the two. This most basic configuration is illustrated in FIG. 2 by dashed line 106. Additionally, the computing device may also have additional features/functionality. For example, computing device 100 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computing device 100. Any such computer storage media may be part of computing device 100.

Computing device 100 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computing device 100 may also have input devices such as a keyboard, mouse, pen, voice input device, touch input device, etc. Output devices such as a display 118, speakers, a printer, etc. may also be included. All these devices are well known in the art and need not be discussed at length here.

The invention is generally directed to a method and system for managing stored data on a computer network, in which the data is divided up into logical volumes, and each volume is separately addressable via a name service. Each logical volume may correspond to an individual computer-readable storage element, such as a disk, or may be stored across multiple storage elements. As the physical location of a volume changes, its physical location can be re-registered with the name service. Thus, devices on the computer network can continue to access the volume via the name service using the volume's "friendly" name. In various embodiments of the invention, the name service can maintain security of the data on the network by restricting the ability of devices on the network to resolve the friendly names of logical volumes into physical paths.

Various embodiments of the invention will now be described in the context of an example network, shown in FIG. 3. The network, generally labeled 150, includes one or more computing devices, represented by a computing device 152 and a domain controller 154. The domain controller 154 has access to a computer-readable medium 156, which may be physically located within the domain controller 154 (within a magnetic hard drive, for example) or may be external to the domain controller 154. The network 150 also includes one or more storage devices, represented in FIG. 3 by storage devices 158 and 160. Each storage device manages computer-readable media and organizes the computer-readable media into logical volumes. Each logical volume represents a collection of data, and is separately recognized by the network 150. An example of a type of logical volume is a disk volume. In some embodiments of the invention, each logical volume represents a separately removable computer-readable medium. For example, the storage device 158 is shown as being a Redundant Array of Independent Disks (RAID) unit having three removable disks 162, 164 and 166. Each disk of the storage device 158 may, itself, constitute a logical volume. Alternatively, logical volumes may be striped across multiple disks. The logical volume 174 is shown as example of such striping. In another example, the storage device 160 is assumed to be a magnetic hard drive with a single disk 176. The disk 176 of the storage device 160 is shown as having multiple logical volumes 178, 180, and 182.

Figure 3:
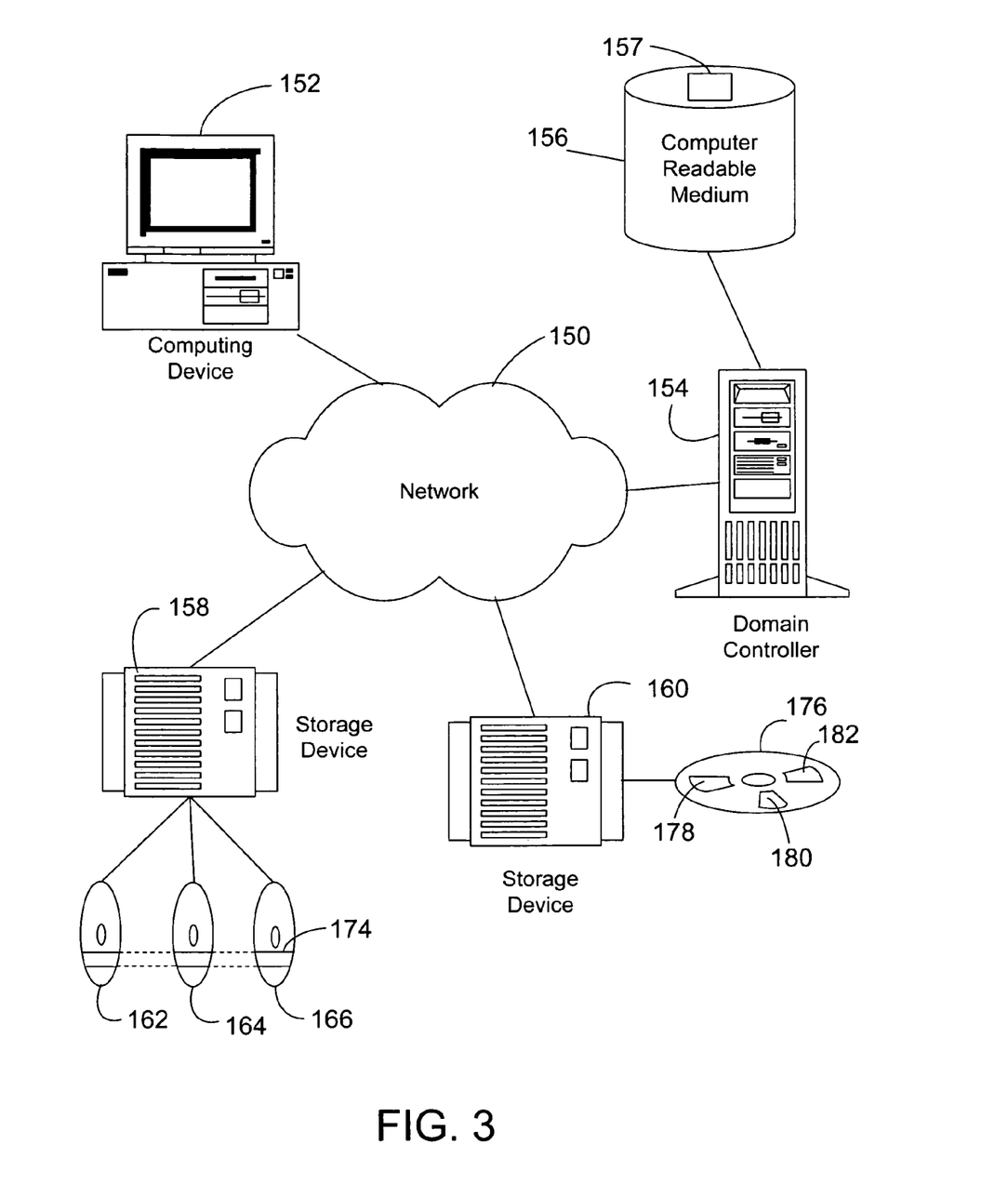
FIGS. 3 and 4 show example embodiments of the invention.

The logical volume examples of FIG. 3 are not meant to be exhaustive. A logical volume may, for example, span multiple data storage devices. In another example, an array of multiple, identical disks can be organized into logical volumes. For example, suppose that a RAID 5 unit has five identical disks. As is known in the art, the capacity of this unit is four (five minus one) times the capacity of each individual disk. The unit can be partitioned into individual volumes. Thus, if each disk is 100 Gigabytes (GB), giving an overall capacity of 400 GB for the RAID 5 unit, then the unit could be partitioned into two logical volumes of 200 GB each.

Referring to FIG. 3, an example of how the logical volume 174 of the storage device 158 is registered with the domain controller will now be described. Upon being connected to the storage area network 150, a registration message is sent to the domain controller 154. The registration message may be generated in a variety of ways. For example, the storage device 158 itself might broadcast the message as soon as it is connected to the network 150. In some embodiments, the storage device 158 will be connected to a switch, such as a Fibre Channel switch, and, upon detecting the presence of the storage device 158, the switch obtains the relevant information from the storage device 158 and sends the registration message to the domain controller 154. In other embodiments, the domain controller 154 discovers the storage device 158 and obtains the relevant information from it. The registration message can be sent according to a variety of protocols. A protocol suitable for the discovery, enumeration and configuration of devices may be used, including Universal Plug and Play (UPnP) and Simple Service Discovery Protocol (SSDP).

The registration message contains a unique identifier, such as a world-wide name, that uniquely identifies the storage device 158. The registration message also includes the identification number and the path of the logical volume on the storage device. If the storage device 158 is a SCSI device, the logical volume may be identified in the registration message by its logical unit number (LUN). The logical volume may also be identified by a world-wide name. As used herein, the term "world-wide name" refers to an effectively unique number of reasonably large size (256 bits, for example). The registration message may also contain additional information, such as the characteristics of the storage device 158 or its location on the topology of the network 150 and the path needed to access it. The request message can also provide information such as a Public/Private Key pair for authorization or for encryption of the channel over which communication with the storage device 158 is taking place.

When the domain controller 154 receives the registration message, it initiates the process of assigning a name to the logical volume 174. In doing so, the domain controller 154 references a data structure 157 to determine whether the storage device 158 has ever registered with the domain controller 154 before. In determining whether the storage device 158 has previously registered, the domain controller 154 may require the storage device 158 to authenticate itself. For example, the domain controller 154 may ask the storage device 158 for a security key, a hash of a certain key value, or a hash of a network attribute in order to verify that the storage device 158 had, in fact, previously registered. If the domain controller 154 determines that it has, then the domain controller 154 may simply continue the naming system previously used with the storage device 158. Otherwise, the domain controller 154 establishes a new naming system for volumes on the storage device 158.

If required, a name is generated for the logical volume 174. The name may be generated in a variety of ways. For example, the domain controller 154 itself may generate the name automatically. Alternatively, a human administrator could choose the name. The name that is chosen for the logical volume 174 may be completely arbitrary, or may convey data concerning the logical volume. For example, the logical volume may be named Finance_vol_1_DataCenter_5_RAID_unit_3" to indicate that the volume is one that is intended to store data generated by the finance department, is the first volume used in that department, and is physically located in Data Center 5 on RAID (Redundant Array of Independent Disks) unit 3. The domain controller 154 then enters the name, referred to hereinafter as the "friendly name," into the data structure 157 and associates the friendly name with the identification number of the storage device 158, and with the path and world-wide name of the logical volume 174. At some point during, or after, the registration process, the domain controller 154 may send a message to the storage device 158 to acknowledge receipt of the registration message or to confirm registration of the logical volume 174. The domain controller 154 may also send other information to the storage device 158, such as an Access Control List (ACL) that identifies which computer systems are permitted to access the storage device 158.

According to various embodiments of the invention, users or programs wishing to obtain access to particular logical volumes stored on a network are required to pass through one or more security checks. These security checks may be enforced by the domain controller 154 of FIG. 3, and/or by some centralized authority such as a MICROSOFT® ACTIVE DIRECTORY® server or MICROSOFT® Passport. Additionally, the domain controller 154 may, itself be a MICROSOFT® ACTIVE DIRECTORY® server. In some embodiments of the invention, the domain controller 154 controls access to storage devices (such as the storage device 158) through the use of the data structure 157. In those embodiments, the data structure 157 contains information that indicates which devices on the network 150 are authorized to gain access to the various logical volumes on the computer network. For example, if the computing device 152 needs to access the logical volume 174 on the storage device 158, it first sends a request to the domain controller 154. The request includes the friendly name of the logical volume 174 and, in some implementations, authentication data such as a certificate or password. The domain controller 154 refers to the data structure 157 to determine whether the computing device 152 and/or the user of the computing device 152 is authorized to access the logical volume 174. In doing so, the domain controller 154 performs such actions as checking an access control list within the data structure 157 and verifying any authentication data received from the computing device 152. Other possible ways of determining whether the user and/or the computing device 152 are authorized to access the logical volume 174 include a challenge/response and a public/private key exchange.

In the previous example, the domain controller may, in addition to the procedures described, publish certain storage devices and/or logical volumes. In this way, the computer systems that do not have physical access to the storage devices and/or logical volumes can learn about them and automatically modify their network topologies or connections to gain access to them.

Figure 4:
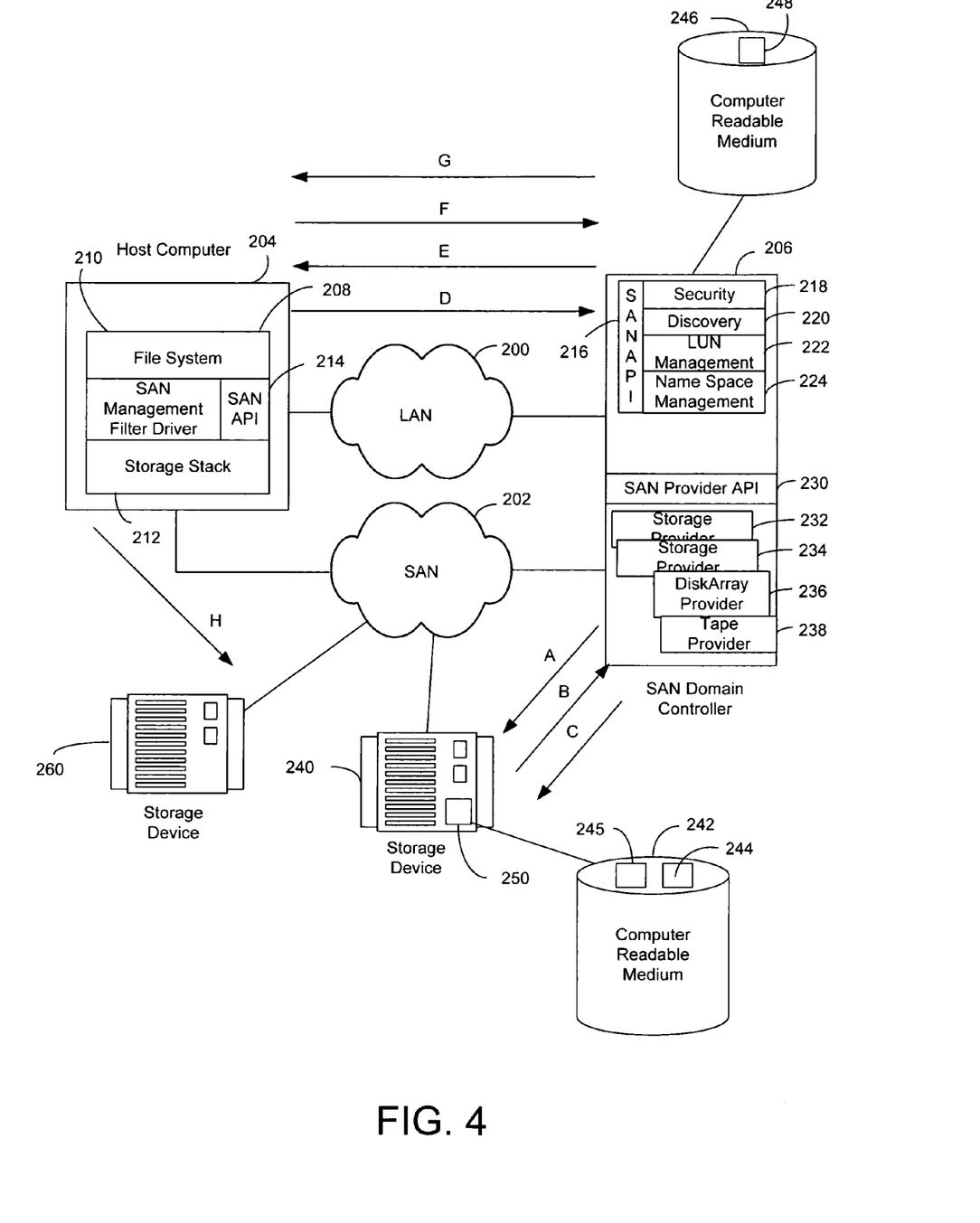

Referring to FIG. 4, an example of how an embodiment of the invention operates will now be described. In this example, it is assumed that there is a local area network (LAN) 200 and a storage area network (SAN) 202. A host computer 204 and a SAN domain controller 206 are each communicatively linked to both the LAN 200 and the SAN 202. Storage devices 240 and 260 are also communicatively linked to the SAN 202. The storage device 240 has access to computer-readable medium 242. A first logical volume of data 244 and a second logical volume of data 245 are stored on the computer readable medium 242. The host computer 204 administers a name service on the storage area network 202 that maps friendly names of logical volumes to their physical paths. The host computer 204 has a file system module 208 for managing files, a SAN management filter driver module 210 for enabling commands and data to be sent to and received from the storage area network 202, a client-side SAN API module 214 for allowing the host computer 204 to make function calls to its counterpart on the domain controller 206, and a storage stack module 212 for enabling the host computer 204 to translate messages in accordance with a storage standard. Possible storage standards include Small Computer System Interface (SCSI), Internet SCSI (iSCSI), serial, Advanced Technology Attachment (ATA), and Fibre Channel. The host computer 206 has access to a computer-readable medium 246, which has stored thereon a data structure 248.

The SAN domain controller 206 executes several program modules, including a security module 218 for authenticating hosts and controlling access to storage devices on the storage area network 202, a discovery module 220 for enabling storage devices on the storage area network 202 to be automatically recognized by the SAN domain controller 206, a LUN management module 222 for keeping track of the logical unit numbers of various logical volumes on the storage area network 202 and a name space management module 224 for keeping track of how friendly names are mapped to network paths for the various logical volumes on the network. The SAN domain controller 206 also executes a SAN provider API module 230, which allows the SAN domain controller 206 to communicate with various storage devices on the storage area network 202. The SAN provider API module 230 abstracts the specifics of each storage device so that the domain controller 206 can communicate with each storage device using a single, common language. The SAN domain controller 206 executes a server-side SAN API module 216 for communicating with clients, such as host computers. Although the SAN domain controller 206 is depicted as a single unit in FIG. 4, it may be implemented as multiple machines. For example, the SAN domain controller 206 could be implemented as a cluster to give it fault tolerance for an internet-based storage system.

The SAN domain controller 206 executes a first storage provider module 232 and a second storage provider module 234 for communicating with the different storage providers made by different manufacturers. Examples of storage providers include switches, disk arrays, so-called JBODs ("just a bunch of disks"), tape libraries and juke boxes. For example, in FIG. 4, the SAN domain controller 206 executes a disk array provider module 236 and a tape provider module 238 to allow the domain controller 206 to communicate with different disk arrays and tape devices manufactured by different vendors.

An example of how the SAN domain controller 206 manages the logical volume 244 (FIG. 4) according to an embodiment of the invention will now be described. The storage device 240 is physically connected to the SAN 202. The SAN domain controller 206 recognizes the presence of the storage device 240 (through Universal Plug and Play, for example) and queries it for information about itself (Arrow A). The storage device 240 then responds by sending a registration message to the SAN domain controller 206 that includes information such as its manufacturer, its world-wide name (according to the Fibre Channel standard, for example), the fact that it has two logical volumes (the first and second logical volumes 244 and 245), the world-wide name of each of the two logical volumes, and information regarding the path of each logical volume on the computer-readable medium 242 (Arrow B). The path information may include a SCSI channel number, port number, SCSI ID and logical unit number (LUN) of each logical volume. The discovery module 220 receives the registration message and generates an acknowledgement message, which the domain controller 206 sends to the storage device 240 (Arrow C). The discovery module 220 then passes the information contained in the registration message to the name space management module 224. The name space management module 224 coordinates with the LUN management module 222 to determine whether there is already an entry for the storage device 240 in the data structure 248. If there is not already an entry, the name space management module 224 generates a friendly name for each of the first and second logical volumes 244 and 245, or asks the system administrator (via a user interface) to create the names. The name space management module 224 and the LUN management module 222 then define a new object for the first and second logical volumes 244 and 245 within in the data structure 248. The new object associates the friendly name generated for the first and second logical volumes 244 and 245 with the world-wide name of the storage device 240, and with the world-wide names and paths of the first and second logical volumes 244 and 245. Optionally, the security module 218 can screen the storage device 240 to determine whether it should be permitted to participate in the name service.

To write and read data to and from the first logical volume 244, for example, the host computer 204 first registers with the SAN domain controller 206, if it has not already done so in the past. It does this by sending a registration message to the SAN domain controller 206 (Arrow D). The registration message includes a request to attach to the SAN, as well as the host computer's authorization credentials (if needed). The security module 218 then executes a security procedure to determine whether the host computer 204 should be permitted to be registered. For example, the security module 218 may determine whether the host computer 204 has authorization to access the SAN 202 and which pieces of hardware the host computer 204 is permitted to access. If the SAN domain controller 206 accepts the registration request, it responds with an acknowledgment message to the host computer 204 (Arrow E). The SAN domain controller 206 then creates a virtualization (a directory tree, for example) of the resources that the host computer 204 is permitted to access, and provides the virtualization to the host computer 204. Once the host computer 204 registers, it can then attempt to access the first logical volume 244. To do so, the host computer 204 determines the friendly name of the first logical volume 244. It may do this by searching a well-known directory located on the LAN 200. The host computer 204 then sends a look-up request to the SAN domain controller 206. The look-up request includes the friendly name of the first logical volume 244 (Arrow F). The security module 218 of the SAN domain controller 206 responds to the request by referencing the data structure 248 to determine whether the host computer 204 is authorized to have access to the first logical volume 244. In making this determination, the security module 218 may analyze authentication data included in the look-up request. For example, the security module 218 may compare a certificate received with the look-up request to those of an access control list maintained in the data structure 248. If the request is approved, the security module 218 extracts the appropriate path information regarding the first logical volume 244 from the data structure 248. The SAN domain controller 206 then sends the path information to the host computer 204 (Arrow G). The host computer 204 then uses the path information to access the first logical volume 244 via the storage area network 202 (Arrow H).

If the security module 218 determines that the host computer 204 is not permitted to have access to the first logical volume 244, then the SAN domain controller 206 sends a denial message to the host computer 204. There may be a variety of reasons for denying access to the host computer 204. For example it may be desirable to prevent the host computer 204 from corrupting the data in the first logical volume 244.

Referring again to FIG. 4, the SAN domain controller 206 keeps track of the paths of the various logical volumes stored on the SAN 202. For example, if the first logical volume 244 is moved from the storage device 240 to the storage device 260, the SAN domain controller 206 discovers the move, either automatically or via a manual update, and updates the corresponding path information in the data structure 248. It could then correctly correlate the name of the first logical volume 244 to the storage device 260 and thereby have the ability to respond correctly to future look-up requests regarding the first logical volume 244. Thus, the fact that the first logical volume 244 had physically moved would be hidden from the host computer 204, as well as all of the other host computers of the LAN 200.

It can thus be seen that a new a useful method and system for managing stored data on a computer network has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A domain controller server for a storage area network (SAN) residing on a data network, the SAN comprising a plurality of heterogeneous storage devices providing logical storage volumes and hosts accessing the logical storage volumes via the SAN, wherein the hosts and storage devices communicate using a standardized SAN protocol that defines storage communications on the SAN and which is stacked on an underlying network communication protocol for general communication via the data network, the domain controller server comprising:

a SAN application programming interface (API) module on the domain controller server, the SAN API module implementing the SAN protocol and handling SAN exchanges between the domain controller server and the storage devices linked to the SAN for storing computer-readable data, wherein the storage devices have corresponding globally unique SAN addresses according to the SAN protocol, wherein logical storage volumes in the SAN have corresponding SAN location paths defined according to the SAN protocol, each logical volume's SAN location path including the SAN address of the logical volume's storage device and a globally unique SAN identifier of the logical volume, wherein a logical volume is accessed by a host via the SAN protocol according to the logical volume's SAN location path, and wherein the hosts access the storage devices with SAN protocol and the logical volumes of the SAN appear to the hosts as though the logical volumes were local storage devices of the hosts;

the domain controller server linked to the SAN and providing a name service to the hosts and the storage devices, the name service not part of the SAN protocol and operating separately from the SAN, the name service comprising associations between SAN location paths of corresponding logical volumes on the SAN and text names of the logical volumes, respectively, the text names having been entered by human input, wherein when a new logical volume first becomes available on the SAN the domain controller server automatically recognizes the new logical volume and in response obtains a new text name for the new logical volume on the SAN and registers with the name service the SAN location path of the new logical volume in association with the new text name; and the domain controller server receiving from the host a lookup request comprising one of the text names of one of the logical volumes, the lookup request not sent via the SAN protocol, and in response to the request the name service on the domain controller server using the requested text name to find, among the associations, the SAN location path of the requested text name, and returning the SAN location path to the host thereby enabling the host to access the logical volume via the SAN with the SAN protocol.

2. The domain controller server of claim 1, wherein the domain controller server executes software for performing steps comprising:

in response to receiving the request from the host, determining whether or not the host is permitted to have access to the logical volume; and granting or denying the request based on the determining step.

3. The domain controller server of claim 1, wherein the domain controller server executes software for performing steps comprising:

reviewing a request from one of the storage device to register a logical volume;

determining whether or not the storage device is permitted to participate in the storage network; and granting or denying the request based on the determining step.

4. The domain controller server of claim 1, wherein one of the logical volumes corresponds to a single removable computer-readable medium.

5. The domain controller server of claim 1, wherein one of the logical volumes corresponds to a single disk of the storage device.

6. The domain controller server of claim 1, wherein one of the logical volumes corresponds to a block of data that is striped across multiple physical disks of the storage device.

7. The domain controller server of claim 1, wherein at least some of the text names do not by themselves identify network locations of the logical volumes.

8. One or more computer readable storage medium storing instructions that when executed by a computing device cause the computing device to operation as a domain controller server for a storage area network (SAN) residing on a data network, the SAN comprising a plurality of heterogeneous storage devices providing logical storage volumes and hosts accessing the logical storage volumes via the SAN, wherein the hosts and storage devices communicate using a standardized SAN protocol that defines storage communications on the SAN and which is stacked on an underlying network communication protocol for general communication via the data network, the domain controller server comprising:

a SAN application programming interface (API) module on the domain controller server, the SAN API module implementing the SAN protocol and handling SAN exchanges between the domain controller server and the storage devices linked to the SAN for storing computer-readable data, wherein the storage devices have corresponding globally unique SAN addresses according to the SAN protocol, wherein logical storage volumes in the SAN have corresponding SAN location paths defined according to the SAN protocol, each logical volume's SAN location path including the SAN address of the logical volume's storage device and a globally unique SAN identifier of the logical volume, wherein a logical volume is accessed by a host via the SAN protocol according to the logical volume's SAN location path, and wherein the hosts access the storage devices with SAN protocol and the logical volumes of the SAN appear to the hosts as though the logical volumes were local storage devices of the hosts;

the domain controller server linked to the SAN and providing a name service to the hosts and the storage devices, the name service not part of the SAN protocol and operating separately from the SAN, the name service comprising associations between SAN location paths of corresponding logical volumes on the SAN and text names of the logical volumes, respectively, the text names having been entered by human input, wherein when a new logical volume first becomes available on the SAN the domain controller server automatically recognizes the new logical volume and in response obtains a new text name for the new logical volume on the SAN and registers with the name service the SAN location path of the new logical volume in association with the new text name; and the domain controller server receiving from the host a lookup request comprising one of the text names of one of the logical volumes, the lookup request not sent via the SAN protocol, and in response to the request the name service on the domain controller server using the requested text name to find, among the associations, the SAN location path of the requested text name, and returning the SAN location path to the host thereby enabling the host to access the logical volume via the SAN with the SAN protocol.

9. A method performed by a computing device comprising a domain controller server for a storage area network (SAN)

residing on a data network, the computing device comprised of memory and a processor, the SAN comprising a plurality of heterogeneous storage devices providing logical storage volumes and hosts accessing the logical storage volumes via the SAN, wherein the hosts and storage devices communicate using a standardized SAN protocol that defines storage communications on the SAN and which is stacked on an underlying network communication protocol for general communication via the data network, the domain controller server performing the method, which comprises:

providing a SAN application programming interface (API) module on the domain controller server, the SAN API module implementing the SAN protocol and handling SAN exchanges between the domain controller server and the storage devices linked to the SAN for storing computer-readable data, wherein the storage devices have corresponding globally unique SAN addresses according to the SAN protocol, wherein logical storage volumes in the SAN have corresponding SAN location paths defined according to the SAN protocol, each logical volume's SAN location path including the SAN address of the logical volume's storage device and a globally unique SAN identifier of the logical volume, wherein a logical volume is accessed by a host via the SAN protocol according to the logical volume's SAN location path, and wherein the hosts access the storage devices with SAN protocol and the logical volumes of the SAN appear to the hosts as though the logical volumes were local storage devices of the hosts;

linking the domain controller server to the SAN and providing a name service to the hosts and the storage devices, the name service not part of the SAN protocol and operating separately from the SAN, the name service comprising associations between SAN location paths of corresponding logical volumes on the SAN and text names of the logical volumes, respectively, the text names having been entered by human input, wherein when a new logical volume first becomes available on the SAN the domain controller server automatically recognizes the new logical volume and in response obtains a new text name for the new logical volume on the SAN and registers with the name service the SAN location path of the new logical volume in association with the new text name; and receiving, at the domain controller server, from the host, a lookup request comprising one of the text names of one of the logical volumes, the lookup request not sent via the SAN protocol, and in response to the request the name service on the domain controller server using the requested text name to find, among the associations, the SAN location path of the requested text name, and returning the SAN location path to the host thereby enabling the host to access the logical volume via the SAN with the SAN protocol.

\* \* \* \* \*